United States Patent [19]

Huegelmeyer et al.

[11] Patent Number: 5,174,620
[45] Date of Patent: Dec. 29, 1992

[54] MANUALLY OPERATED ANIMAL WASTE COLLECTOR

[76] Inventors: Bernd Huegelmeyer, Wilhelm Str. 97; Ines Brokmann, Schledehauser 93, both of 4500 Osnabrueck, Fed. Rep. of Germany

[21] Appl. No.: 649,984

[22] Filed: Feb. 4, 1991

[30] Foreign Application Priority Data

Feb. 9, 1990 [DE] Fed. Rep. of Germany ....... 9001473

[51] Int. Cl.$^5$ .......................... A01K 29/00; E01H 1/12
[52] U.S. Cl. .................................................. 294/1.3
[58] Field of Search ................................... 294/1.3–1.5, 294/19.1, 50.8, 55, 115, 116; 15/257.1, 257.6, 257.7; 119/161, 165

[56] References Cited

U.S. PATENT DOCUMENTS

| | | | |
|---|---|---|---|
| 3,703,158 | 11/1972 | Lemler | 294/1.3 |
| 4,056,278 | 11/1977 | Bau et al. | 294/1.4 |
| 4,078,838 | 3/1978 | Nadratowski | 294/1.4 |
| 4,179,145 | 12/1979 | Shinsako | 294/1.4 |
| 4,200,319 | 4/1980 | Cooper | 294/1.4 |
| 4,210,351 | 7/1980 | Orofino | 294/1.4 X |
| 4,247,139 | 1/1981 | Grieb | 294/1.4 |
| 4,253,691 | 3/1981 | Liu | 294/1.4 |
| 4,466,648 | 8/1984 | Albiez | 294/1.4 |
| 4,477,111 | 10/1984 | Crooks | 294/1.4 |
| 4,875,729 | 10/1989 | Peck | 294/1.3 |
| 4,995,661 | 2/1991 | Aurness | 294/1.4 |

FOREIGN PATENT DOCUMENTS

| | | | |
|---|---|---|---|
| 2069 | 5/1979 | European Pat. Off. | 294/1.4 |
| 3225602 | 1/1984 | Fed. Rep. of Germany | 294/1.3 |
| 3412338 | 10/1984 | Fed. Rep. of Germany | 294/1.4 |
| 8530699 | 2/1986 | Fed. Rep. of Germany | . |
| 2611431 | 9/1988 | France | 294/1.4 |
| 2032831 | 5/1980 | United Kingdom | 294/1.3 |

*Primary Examiner*—Johnny D. Cherry
*Attorney, Agent, or Firm*—Jordan and Hamburg

[57] ABSTRACT

Manually operated device for collecting animal feces as well as leading animals, e.g. dogs. This device is provided with a container in its lower section with grip-like flaps which can be swung in- and outwards with a collecting bag attached. In their open position the flaps will be placed over the feces, which are collected by closing the flaps. Within the device there is a retracting mechanism with a release position for the clean disposal of the feces, and in the upper section of the box there is an extendable dog-leash.

20 Claims, 6 Drawing Sheets

MANUALLY OPERATED ANIMAL WASTE COLLECTOR

The present invention relates to a manually operated device for the collection and disposal of animal feces.

BACKGROUND OF THE INVENTION

With one familiar device of this kind (DE-OS 29 41 356), the collector ha an upper section closed at the sides and open to the bottom, fitted at its longitudinal edges with hinged flaps bent on the inside. The flaps, which form grippingmeans, bound in closed position at the bottom a roughly semicylindrical chamber open at the front, overlapping at their free horizontal edges. The upper section of the collector is fitted with a clamping device for the upper closed end of a single bag, whose lower free end can be turned up around the gripping means to the outside. When using the device, feces located on the ground are transferred to the inside of the bag straddling the lower end of the device by closing motion of the gripping means.

A device of this type is difficult to handle after picking up the feces, and until the used bag has been removed, there is a danger of outer parts of the bag near the free edges of the gripping means, which pass over the ground foulded by the feces when picking up the same, being soiled by remains of feces.

SUMMARY OF THE INVENTION

The present invention is based on the task of constructing a manually operated device of the type described above which is particularly easy to handle and avoids the danger of fouling.

With the manually operated device in accordance with the present invention, it is possible to pull external soiled parts of the bag into the collector after picking up the feces by lifting the closed rear end of the bag. At the same time, the rear end of the bag moves into a release position while being lifted, from which the bag can fall out of the container inside the collector under the force of gravity when the gripping means are opened and into a suitable disposal receptacle. Neither the collector nor the user thereof runs the risk of being soiled until a used bag is ejected, so that the device can be handled in a very hygienic and user-friendly manner without particular attention having to be paid thereto not only before but also after picking up the feces and until ejection of a used bag.

Numerous further details are given in the follow description and the drawing, in which two embodiments of the object of the present invention are schematically illustrated in more detail.

DESCRIPTION OF THE PREFERRED EMBODIMENTS

The manually operated device shown in the drawing for the disposal of animal feces or similar materials comprises a collector 1, which for its part comprises in its upper section a handle 2 with handle recess 3 located thereunder and in its lower section two flaps or gripping means 4,5 which can be swung inwards and outwards.

Collector 1 consists preferably of two half sections 6,7 which adjoin each other along a connecting plane 8 coinciding with the longitudinal centre plane of the device and are interconnected, for example, by means of a suitable screw connection or snap-in locking device not illustrated in more detail. The half sections 6,7 are appropriately designed as relatively thin-walled injection-moulded plastic parts, for example of PVC, polyethylene or polyurethane.

Both half sections 6,7 bound between themselves a space to accommodate further components to be described in more detail of collector 1, and gripping means 4,5 of collector 1 bound a container 9 for feces closed at the bottom and at the sides. For this purpose, gripping means 4,5 are designed as U-shaped shells in the horizontal section and L-shaped shells in the vertical section, which in closed condition are adjacent at their edges facing each other and are essentially a flush continuation of the upper section of the collector.

Gripping means 4,5 may, as shown, be separate injection-moulded plastic parts connected in hinged fashion around axes 10,11 to the upper section of the collector. Instead, however, the gripping means may also form an integral part of half sections 6,7, in which case the axes of the gripping means take the form of a hinge. Such a design is particularly simple and advantageous from the assembly point of view and will be further described hereinafter in connection with the alternate embodiment shown in FIG. 9.

At the side of each of gripping means 4,5 is preferably a flat guide bar 12,13 appropriately likewise constructed as an integral part of half sections 6,7 of collector 1. Guide bars 12,13 extend roughly as far as the lower opening plane of gripping means 4,5 in open condition and are of a width which, when mounted externally, essentially corresponds to the front width of collector 1. Guide bars 12,13, which may also be mounted on the inside at the front of gripping means 4,5, are used to guide the sheeting of a bag 15 to pick up animal feces to be disposed of, as described below, and at the same time serve as stop elements on the ground preventing gripping means 4,5 in open condition from being swung by force beyond their preset opening position, resulting in damage to the device, when positioning the device on the ground.

To move gripping means 4,5, an actuating member 20 is provided consisting of an actuator rod 21 controllable by the finger of an operator holding the device at handle 2. The lower section 22 of actuator rod 21 is designed as a two-face toothed rack gripping toothed wheel segments 23,24 on the inside of gripping means 4,5 and intermeshing therewith.

Actuator rod 21, which has an eye 25 at its upper end for the finger of an operator and can be moved upwards and downwards inside collector 1 close to the front thereof, is prestressed by a pressure spring 26 supported within collector 1, which in the example shown acts upon the upper end of actuator rod 21 with the aim of pushing said actuator rod downwards, thus swinging gripping means 4,5 into open condition. Actuator rod 21 is furthermore provided with two locking elements 28,29 which in the case of upward movement of actuator rod 21 against the action of pressure spring 26 snap in succession into lock position within a recess 27 of the collector. The locking members can be moved out of lock position by means of a release knob 30 assigned to recess 27. If locking member 29 is locked to wall 31 of recess 27, it secured gripping means 4,5 in closed condition, in which the edges of gripping means 4,5 facing one another are located at a short distance from one another. If in the course of a further upward movement of actuator rod 21, locking member 28, located at a distance behind locking member 29, is locked with recess 27, gripping means 4,5 are in completely closed condition, in which their edges facing each other touch and exert pressure on one another.

Figure 9:
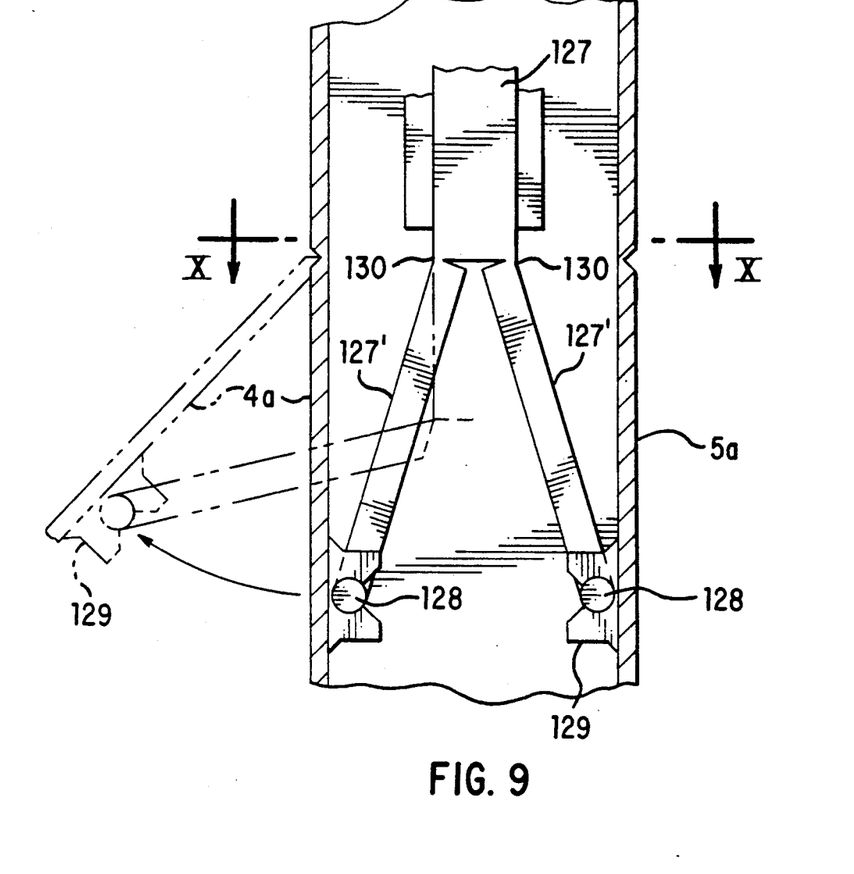
FIG. 9 is a simplified view similar to FIG. 5 illustrating a modified further version.
Figure 10:
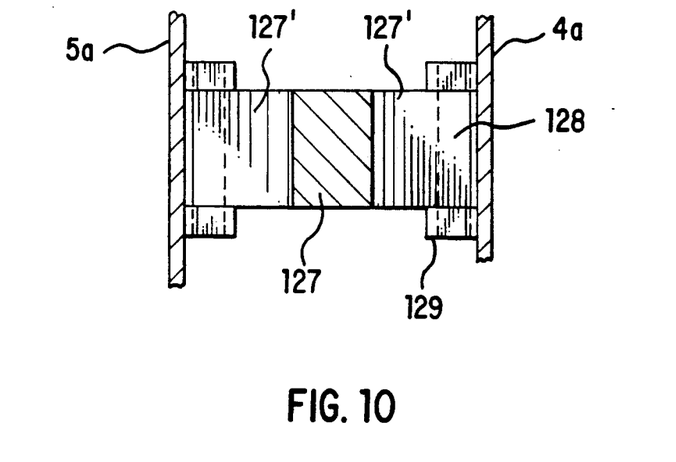
FIG. 10 is a truncated sectional view taken along the line X—X of FIG. 9.

As shown in the alternate embodiment in FIG. 9, actuator rod 127 may also in its lower section divide into two articulated plungers 127', connected by hinges 130 and acting by way of locking joint pin 128 at locking joints 129 at gripping means 4a, 5a in articulated fashion. This locking joint connection is particularly advantageous from the assembly point of view.

In the centre section of collector 1 is a device 40 to fix a bag 15 to receive feces in collector 1, comprising a fastening member to grasp bag 15 at its rear closed end.

Figure 3:
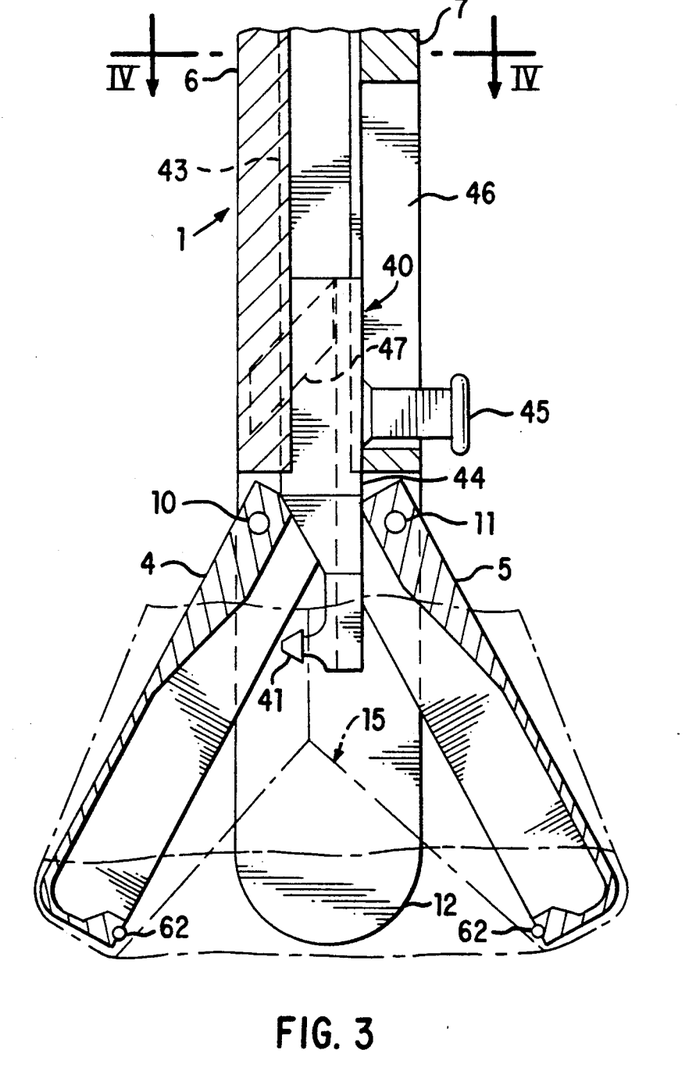
FIG. 3 is a truncated section view of the device taken along the line III—III of FIG. 1 with gripping means in open condition.

In the embodiment as illustrated in FIG. 3, this fastening member consists of a hook 41 to suspend the rear closed end of the bag provided with a perforation 42. The bag is fixed at the lower end of a slide 44 moving upwards and downwards in a guideway 43 in collector 1. Slide 44 is movable by means of a handle member 4, which reaches through a slot 46 in the wall of half section 7 of collector 1, from a lower final position as illustrated in FIG. 3 into an upper final position, and in the course of this upward movement, hook 41 moves from a lower receiving position for the end of the bag in the area between gripping means 4,5 into a release position above container 9 bounded by gripping means 4,5.

The release position may be defined by the upper final position of slide 44 or also by a release member which cancels the fixing of the bag at the fastening member when said fastening member approaches the release position.

Figure 4:
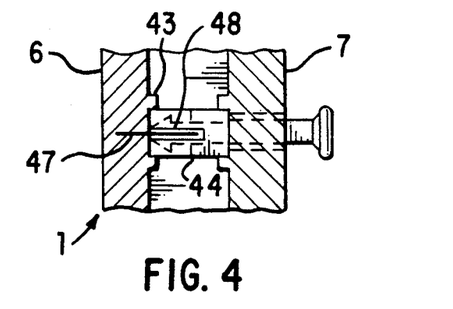
FIG. 4 is a truncated sectional view taken along the line IV—IV of FIG. 3.

In the embodiment as illustrated in FIG. 3, a cutting knife 47 is provided as a release member in the path of movement of hook 41, and hook 41 is provided with a slot 48 (FIG. 4) parallel to its path of movement, into which cutting knife 47 moves into release position at the end of the movement of hook 41, separating bag edge 49 adjoining perforation 42. Instead of an embodiment of this kind, a stripper could also be provided as a release member, which engages with bag 15 on both sides of perforation 42 when hook 41 approaches release portion and detaches the end of the bag from hook 41.

Figure 5:
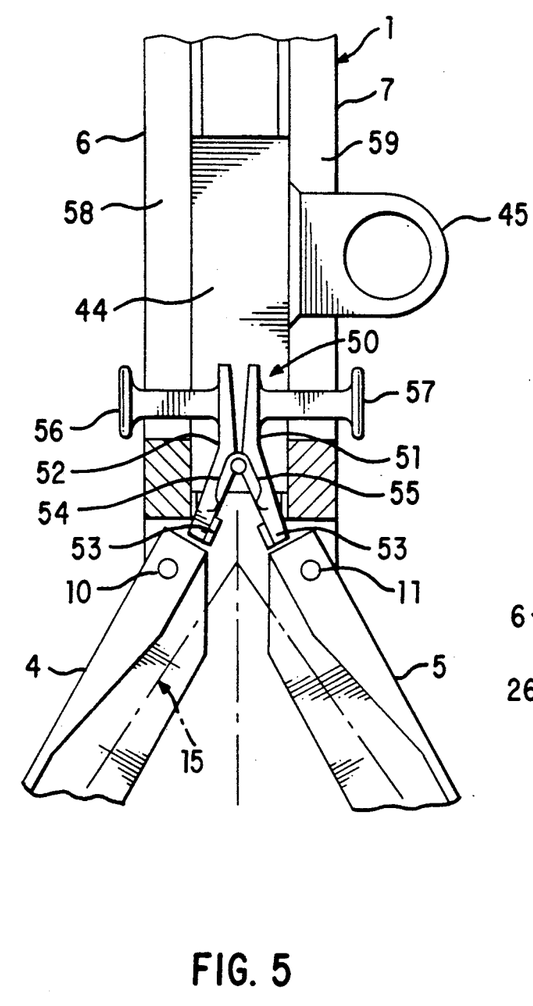
FIG. 5 is a truncated detailed view similar to FIG. 3, illustrating a modified version.
Figure 6:
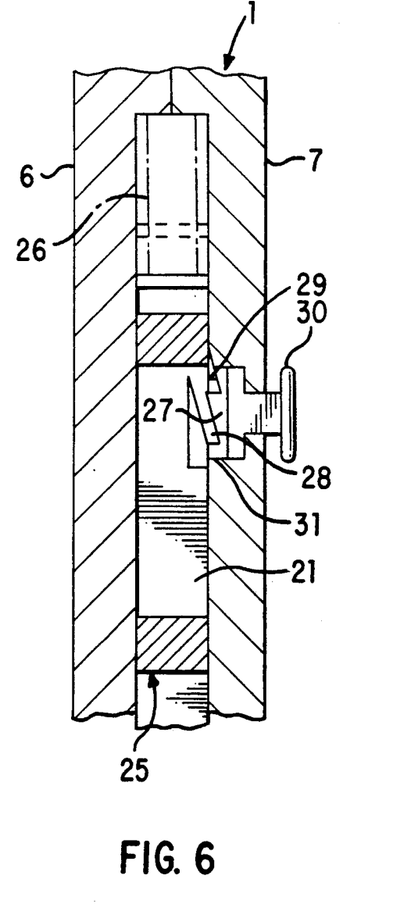
FIG. 6 is a truncated sectional view taken along the line VI—VI of FIG. 1.

In the alternate embodiment as illustrated in FIG. 5, the fastening member is designed as a clamp 50, comprising two arms 51,52 each provided with a jaw 53, which can be engaged and disengaged by swivelling in the manner of tongs around a common axis 54 and are prestressed by a tension spring 55 for movement into clamping position. At the free ends of arms 51,52 opposite to jaws 53, push buttons 56,57 are provided, which project outwards through slots 58,59 in the wall of collector 1 and can be operated by finger pressure to move clamp 50 into open position as illustrated in FIG. 5. In this open condition, the rear closed end of bag 15 can be inserted between jaws 53 and clamp 50 closed by spring 55 by releasing push buttons 56,57.

Clamp 50 is likewise fastened to a slide 44, movable along guideways 43 in collector 1 as described in connection with the embodiment as illustrated in FIG. 3. In the embodiment as illustrated in FIG. 5, the release of the bag end held by clamp 50 can be effectuated manually in release position by opening clamp 50. In place thereof a release member, for example a cam element not illustrated here in greater detail assigned to each of arms 51,52, may also be provided, which engages with arms 51,52 when clamp 50 approaches release position and releases jaws 53 from their clamp engagement of bag 15.

Figure 11:
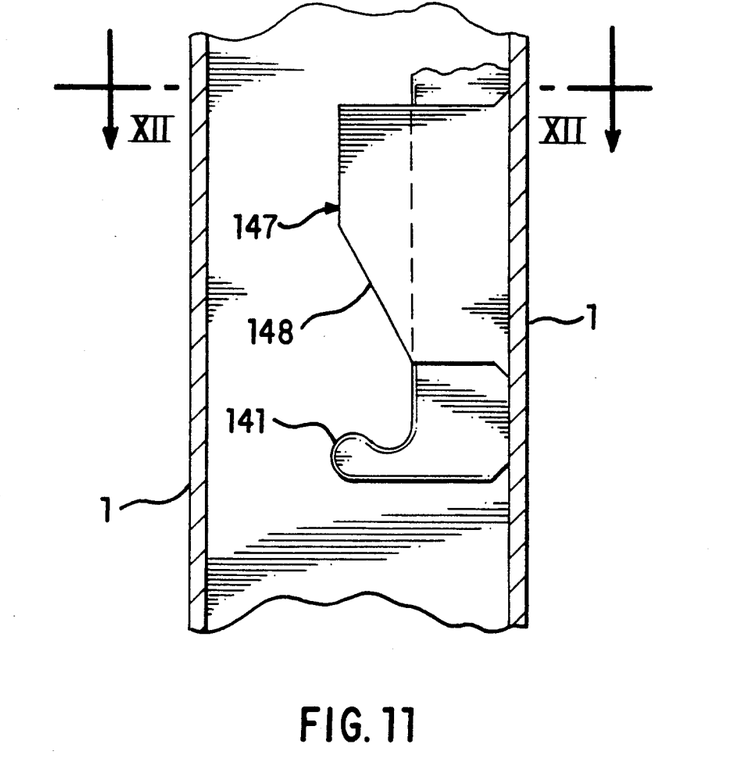
FIG. 11 is a truncated cutout view of a modified fastening element for fixing the bag.
Figure 12:
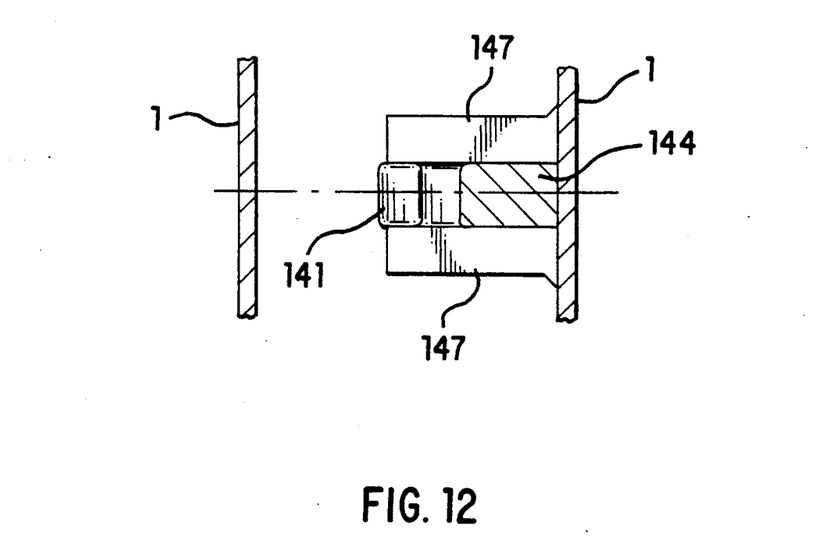
FIG. 12 is a truncated sectional view taken along the line XII—XII of FIG. 11.

As illustrated by FIGS. 11 and 12, hook 141 may have a rounded top, which acts together with strippers 147 with inclines 148 mounted on both sides of slide 144. When hook 141 approaches its upper end position, strippers 147 detach bag 15 suspended on hook 141 on one side, thus effectuating release.

Figure 7:
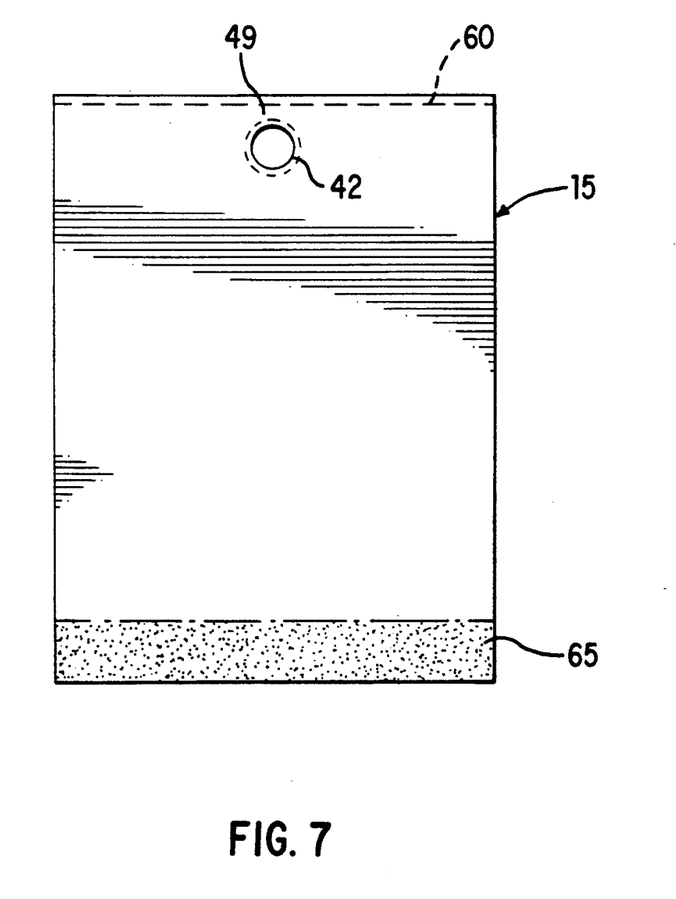
FIG. 7 is a schematic side view of a bag adapted in its dimensions and design to the manually operated device.
Figure 8:
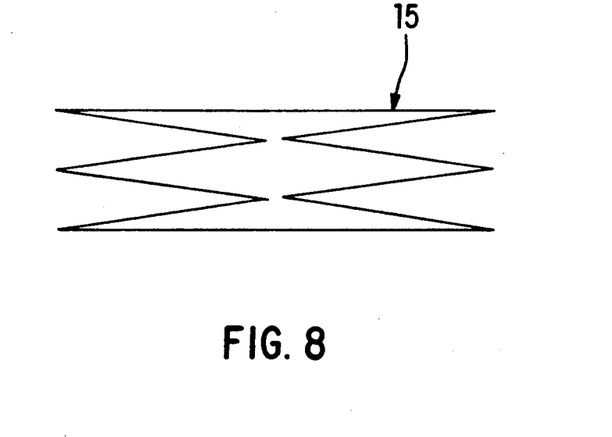
FIG. 8 is a schematic sectional view of FIG. 7.

As illustrated by FIGS. 7 and 8, the bag is preferably designed as a double-walled folding bag, closed at its rear end by a transverse seam 60. Bag 15 consists advantageously of plastic sheeting sealable or weldable at low temperatures. By this means, a used bag may be closed near its lower end by sealing or welding using heating elements 62 which ma be embedded in the edges of gripping means 4,5 as indicated schematically in FIG. 3. Heating elements 62 may be connected by electric wires and a switch (not illustrated) to a battery (likewise not illustrated in greater detail) which can be accommodated in the collector for the purpose of temperature rise by resistance.

The bag may likewise be provided with a closing device 65. To use the manually operated device, actuator rod 21 is released for downward movement by actuating release knob 30, thus effectuating the opening of gripping means 4,5. A bag 15 is then connected at its closed rear end to fastening member 41 or 50, which for this purpose is pushed down between gripping means 4,5 into receiving position. Subsequently the lower end of the bag is spread out and the bag sheeting turned up or draped around of the gripping means 4,5 and guide bars 12,13 as schematically illustrated in FIG. 3. The manually operated device prepared in this way is then positioned above the animal feces for the collection of said feces, following which the closing of gripping means 4,5 is effectuated by pulling up actuator rod 21 by way of eye 25, first as far as closed position, in which fastening member 41 or 50 together with bag 15 and the contents of same are pulled up a short distance within collector 1 by means of slide 44. In this way, at least that part of the turned-up bag which might have become soiled during the feces pick-up procedure is drawn into collector 1.

Subsequently, the complete closing of gripping means 4,5 is effectuated by means of actuator rod 21; in this closed condition, said gripping means are locked. Bag 15 can if necessary be closed by means of heating elements 62 or by means of closing device 65, which is advantageously in the area of the bag still outside collector 1 when bag 15 is in release position, thus ensuring a hygienic enclosure of the contents of the bag, At a convenient time, bag 15 can be ejected into a disposed receptacle. On reaching release position, the bag will already have automatically detached itself from fastening member 51 or 50.

Figure 1:
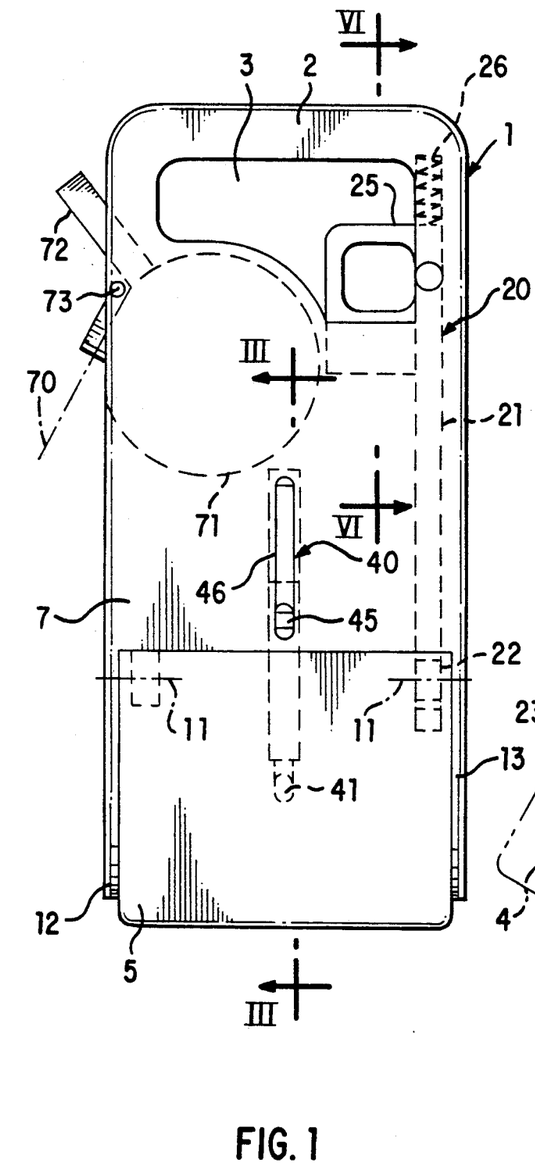
FIG. 1 is a schematic side view of the device in accordance with the present invention.
Figure 2:
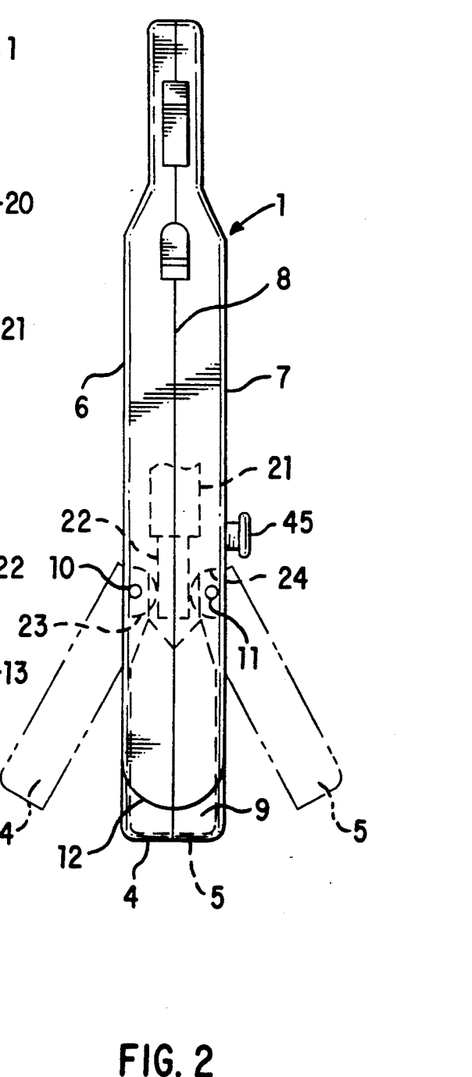
FIG. 2 is a front view of the device in accordance with FIG. 1.

As illustrated by FIG. 1, collector 1 is also suitable to accommodate an additional functional element, namely a dog lead 70, which can be wound onto and from a reel 71 coupled to a spring drive or spring loaded device, which reel also incorporates a locking device 72 and a blocking device 73.

I claim:

1. A device for collecting waste material in a container comprising a collector structure, flap means pivotably supported on said collector structure and pivotal between an open and a closed position, operable means operably connected to said flap means and operable to pivotably move said flap means between said open and closed positions, slide means slidably mounted on said collector structure between a plurality of operable positions and a release position, said slide means having holding means for holding said container when said slide means is in said operable positions, and release means on said collector structure operable to release said container from said holding means when said slide means slides into said release position, said flap means being operable to pass waste material into said container as said flap means is pivoted from said open position toward said closed position and as said slide means is in said operable positions and said holding means holds said container, said slide means being subsequently moveable from said operable positions to said release position to effect release of said container from said holding means by said release means.

2. A device according to claim 1, wherein said release means is operable to automatically release said container from said holding means as said slide means moves into said release position.

3. A device according to claim 1, wherein said release means is disposed in a fixed position on said collector structure.

4. A device according to claim 1, wherein said holding means comprises a projection which holds said container, said release means comprises a pushing means on said collector structure which is operable to push said container off of said projection to thereby effect release of said container from said holding means.

5. A device according to claim 1, wherein said release means comprises a severing means which severs said container to effect release from said holding means.

6. A device according to claim 1, wherein said plurality of operable position of said slide means includes an extended position, said slide means being slidable from said extended position to said release position, said slide means in said extended position disposing said holding means in a position between said flap means such that a container can be passed between said flap means, as said flap means is in said open position, to said holding means to effect attachment of said container to said holding means.

7. A device according to claim 6, wherein said container is a flexible bag, said flap means comprising a pair of pivotal flap members having terminating end portions, said bag having an open end portion, said bag having an initial mounting position in which said open end portion of said bag is draped over said terminating end portions of said pivotal flap members, said sliding means being in said extended position when said bag is in said initial mounting position, said bag having a drawn-in position in which said open end portion of said bag is removed from being draped over said terminating end portions of said flap members and is disposed between said two flap members, said sliding means in sliding from said extended position toward said release position being operable to slide said bag from said initial mounting position to said drawn-in position.

8. A device according to claim 1, wherein said flap means comprises a pair of half enclosure members substantially enclosing an enclosure area between said pair of half enclosure members when said flap means is in said closed position.

9. A device according to claim 8, wherein said container is a flexible bag which is disposed within said enclosure area when said flap means is in said closed position.

10. A device according to claim 1, wherein said collector structure comprises a casing an a leash means in said casing, said leash means comprising a reel and an elongated leash which is windable and unwindable on said reel.

11. A device according to claim 1, wherein said collector structure comprises an enclosure casing, said enclosure casing having a handle, said flap means comprising an actuatable member extending externally of said casing for actuating said flap means between said open and closed positions, said actuatable member being disposed juxtaposed to said handle so that said actuatable member is actuatable by a person's and which is grasping said handle.

12. A device according to claim 1, wherein said collector structure comprises an enclosure casing, said slide means comprising a slide element and an actuatable element, said slide element being disposed within said enclosure casing, said actuatable element extending externally of said enclosure casing.

13. A device for collecting waste material from a collection surface and passing said collected waste material into a flexible bag comprising a collector structure, flap members pivotably supported on said collector structure and pivotal between an open and a closed position, operable means operably connected to said flap members and operable to pivotably move said flap members between said open and closed positions, holding means on said collector structure operable to hold said bag, said flap members being operable to pass waste material into said bag as said flap members are pivoted from said open position toward said closed position and as said holding means holds said bag, each of said flap members having a terminating end portion juxtaposed to one another when said flap members are in said closed position, said terminating end portions being spaced from one another when said flap members are in said open position, said collector structure having guide bars extending to a position juxtaposed to said terminating end portions of said flap members when said flap members are in said closed position, said guide bars having terminating end sections operable to engage said collection surface on which is disposed the waste material to be collected to thereby enhance protection of said flap members against damage when said flap members are in said open position and the device is operated to collect said waste material from said collection surface.

14. A device according to claim 13, wherein said guide bars are flat plates.

15. The combination comprising a flexible waste collector bag, a structure means for holding said bag and operable with said bag to collect waste material, said structure means comprising a casing, flap means pivotably supported on said casing and pivotal between an open and a closed position, operable means operably connected to said flap means and operable to pivotably move said flap means between said open and closed positions, slide means slidably mounted on said casing between a plurality of operable positions and a release portion, said slide means having holding means operable to hold said bag when said slide means is in said operable positions, and release means on said casing operable to release said bag from said holding means when said slide means slides into said release position, said flap means being operable to pass waste material into said bag as said flap means is pivoted from said open position toward said closed position and as said slide means is in said operable positions and said holding means holds said bag, said slide means being movable from said operable positions to said release position to effect release of said bag from said holding means by said release means.

16. The combination according to claim 15, wherein said bag has a closed end portion, and opening means in said closed end portion defining an opening, said holding means comprising a projection which receives said opening in said bag to hold said bag on said projection.

17. The combination of claim 16, wherein said projection comprises a hook, said opening being hooked on said hook.

18. The combination of claim 16, wherein said bag comprises two spaced outer walls defining a bag interior between said two spaced outer walls, a seal extending about the outer periphery of said opening, said seal sealing portion of said two spaced walls to each other to thereby seal said opening from said interior of said bag.

19. The combination according to claim 15 further comprising locking mans on said structure means cooperable with said flap means for locking said flap means in said closed position.

20. The combination of claim 15 further comprising biasing means between said structure means and said flap means for biasing said flap means in said open position.

* * * * *